(12) United States Patent
Karplus et al.

(10) Patent No.: US 12,085,647 B2
(45) Date of Patent: Sep. 10, 2024

(54) LIDAR OCCLUSION DETECTION METHODS AND SYSTEMS

(71) Applicant: Waymo LLC, Mountain View, CA (US)

(72) Inventors: Paul Karplus, Redwood City, CA (US); Blaise Gassend, East Palo Alto, CA (US); Nicholas Armstrong-Crews, Mountain View, CA (US); Scott McCloskey, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 928 days.

(21) Appl. No.: 17/131,594

(22) Filed: Dec. 22, 2020

(65) Prior Publication Data
US 2021/0199801 A1    Jul. 1, 2021

Related U.S. Application Data

(60) Provisional application No. 62/954,338, filed on Dec. 27, 2019.

(51) Int. Cl.
*G01C 3/08*    (2006.01)
*G01S 7/484*    (2006.01)
(Continued)

(52) U.S. Cl.
CPC .............. *G01S 17/18* (2020.01); *G01S 7/484* (2013.01); *G01S 7/486* (2013.01); *G01S 7/4817* (2013.01)

(58) Field of Classification Search
CPC .......... G01S 17/18; G01S 7/484; G01S 7/486; G01S 7/4817
See application file for complete search history.

(56) References Cited

U.S. PATENT DOCUMENTS 7,602,485 B2    10/2009    Mori
8,085,389 B2    12/2011    Satzky et al.
(Continued)

FOREIGN PATENT DOCUMENTS

DE    19707418 A1    8/1998
DE    19800968 C2 *  10/2002    ............. G01S 7/497
(Continued)

OTHER PUBLICATIONS

International Search Report and Written Opinion for PCT/US2020/066797 mailed Apr. 22, 2021 (10 pages).
(Continued)

*Primary Examiner* — Mark Hellner
(74) *Attorney, Agent, or Firm* — McDonnell Boehnen Hulbert & Berghoff LLP

(57) ABSTRACT

The present disclosure relates to systems and methods for occlusion detection. One example method involves a light detection and ranging (LIDAR) device scanning at least a portion of an external structure within a field-of-view (FOV) of the LIDAR device. The LIDAR device is physically coupled to the external structure. The scanning comprises transmitting light pulses toward the external structure through an optical window, and receiving reflected light pulses through the optical window. The reflected light pulses comprise reflections of the transmitted light pulses returning back to the LIDAR device from the external structure. The method also involves detecting presence of an occlusion that at least partially occludes the LIDAR device from scanning the FOV based on at least the scan of the at least portion of the external structure.

20 Claims, 7 Drawing Sheets

(51) Int. Cl.
  *G01S 7/486* (2020.01)
  *G01S 17/18* (2020.01)
  *G01S 7/481* (2006.01)

(56) References Cited

U.S. PATENT DOCUMENTS

| | | |
|---|---|---|
| 8,681,323 B2 | 3/2014 | Wasawa et al. |
| 10,094,786 B2 | 10/2018 | Hasegawa |
| 10,192,147 B2 | 1/2019 | Bleyer et al. |
| 10,209,709 B2 | 2/2019 | Peters et al. |
| 10,458,811 B2 | 10/2019 | Voeller et al. |
| 2007/0085728 A1 | 4/2007 | Matsuoka |
| 2012/0113410 A1 | 5/2012 | Iwasawa et al. |
| 2012/0236319 A1 | 9/2012 | Gotou et al. |
| 2015/0293228 A1 | 10/2015 | Retterath et al. |
| 2015/0362588 A1 | 12/2015 | Ohmuro et al. |
| 2018/0188361 A1 | 7/2018 | Berger et al. |
| 2018/0284268 A1* | 10/2018 | McWhirter ............ G01S 17/42 |
| 2019/0250259 A1 | 8/2019 | Frieventh Cienfuegos et al. |

FOREIGN PATENT DOCUMENTS

| | | |
|---|---|---|
| DE | 202012003277 U1 | 7/2012 |
| EP | 3367135 A1 | 8/2018 |
| JP | S59-145982 A | 8/1984 |
| JP | H10142335 A | 5/1998 |
| JP | 2011-022080 A | 2/2011 |
| JP | 2017090380 A | 5/2017 |
| JP | 6497071 B2 | 4/2019 |
| WO | 2018094373 A1 | 5/2018 |
| WO | 2019197894 A1 | 10/2019 |

OTHER PUBLICATIONS

Bybee et al., "Algorithm for Point Cloud Occlusion Mapping on an Autonomous Ground Vehicle", 2019 NDIA Ground Vehicle Systems Engineering And Technology Symposium Autonomous Ground Systems (AGS) Technical Session, Aug. 13-15, 2019.

* cited by examiner

LIDAR OCCLUSION DETECTION METHODS AND SYSTEMS

CROSS-REFERENCE TO RELATED APPLICATION

This application claims priority to U.S. Provisional Patent Application No. 62/954,338, filed on Dec. 27, 2019, the entirety of which is incorporated herein by reference.

BACKGROUND

Some Light Detection and Ranging (lidar) systems utilize a light-emitting transmitter (e.g., a laser diode) to emit light pulses into an environment. Emitted light pulses that interact with (e.g., reflect from) objects in the environment can then be received by a receiver (e.g., a photodetector) of the lidar system. Range information about the objects in the environment can then be determined based on a time difference between an emission time of a light pulse and a receipt time of a returning reflection of the emitted light pulse.

SUMMARY

In one example, a method is provided. The method involves scanning, by a light detection and ranging (LIDAR) device physically coupled to an external structure, at least a portion of the external structure that is within a field-of-view (FOV) of the LIDAR device. The scanning comprises transmitting, through an optical window, light pulses in different directions toward the external structure. The scanning also comprises receiving, through the optical window, reflected light pulses comprising reflections of the transmitted light pulses returning back to the LIDAR device from the external structure. The method also involves detecting, based on at least the scan of the at least portion of the external structure, presence of an occlusion that at least partially occludes the LIDAR device from scanning the FOV.

In another example, a system is provided. The system includes a mounting structure, a light detection and ranging (LIDAR) device mounted to the mounting structure, an optical window, one or more processors, and data storage. The data storage stores instructions that, when executed by the one or more processors, cause the system to perform operations. The operations include scanning at least a portion of the mounting structure that is within a field-of-view (FOV) of the LIDAR device. The scanning involves transmitting, through the optical window, light pulses from the LIDAR device in different directions toward the mounting structure. The scanning also involves receiving, through the optical window, reflected light pulses comprising reflections of the transmitted light pulses returning back to the LIDAR device from the mounting structure. The operations also include detecting, based on at least the scan of the at least portion of the mounting structure, presence of an occlusion that at least partially occludes the LIDAR device from scanning the FOV.

In yet another example, a non-transitory computer readable medium is provided. The non-transitory computer readable medium stores instructions that, when executed by one or more processors, cause a system to perform operations. The operations include scanning, using a light detection and ranging (LIDAR) device physically coupled to an external structure, at least a portion of the external structure that is within a field-of-view (FOV) of the LIDAR device. The scanning comprises transmitting, through an optical window of the LIDAR device, light pulses in different directions toward the external structure. The scanning also comprises receiving, through the optical window, reflected light pulses comprising reflections of the transmitted light pulses returning back to the LIDAR device from the external structure. The operations also include detecting, based on at least the scan of the at least portion of the external structure, presence of an occlusion that at least partially occludes the LIDAR device scanning the FOV.

In still another example, a system is provided. The system includes means for scanning, by a light detection and ranging (LIDAR) device physically coupled to an external structure, at least a portion of the external structure that is within a field-of-view (FOV) of the LIDAR device. The scanning comprises transmitting, through an optical window, light pulses in different directions toward the external structure. The scanning also comprises receiving, through the optical window, reflected light pulses comprising reflections of the transmitted light pulses returning back to the LIDAR device from the external structure. The system also includes means for detecting, based on at least the scan of the at least portion of the external structure, presence of an occlusion that at least partially occludes the LIDAR device from scanning the FOV.

Other aspects, embodiments, and implementations will become apparent to those of ordinary skill in the art by reading the following detailed description, with reference where appropriate to the accompanying drawings.

DETAILED DESCRIPTION

Figure 1:
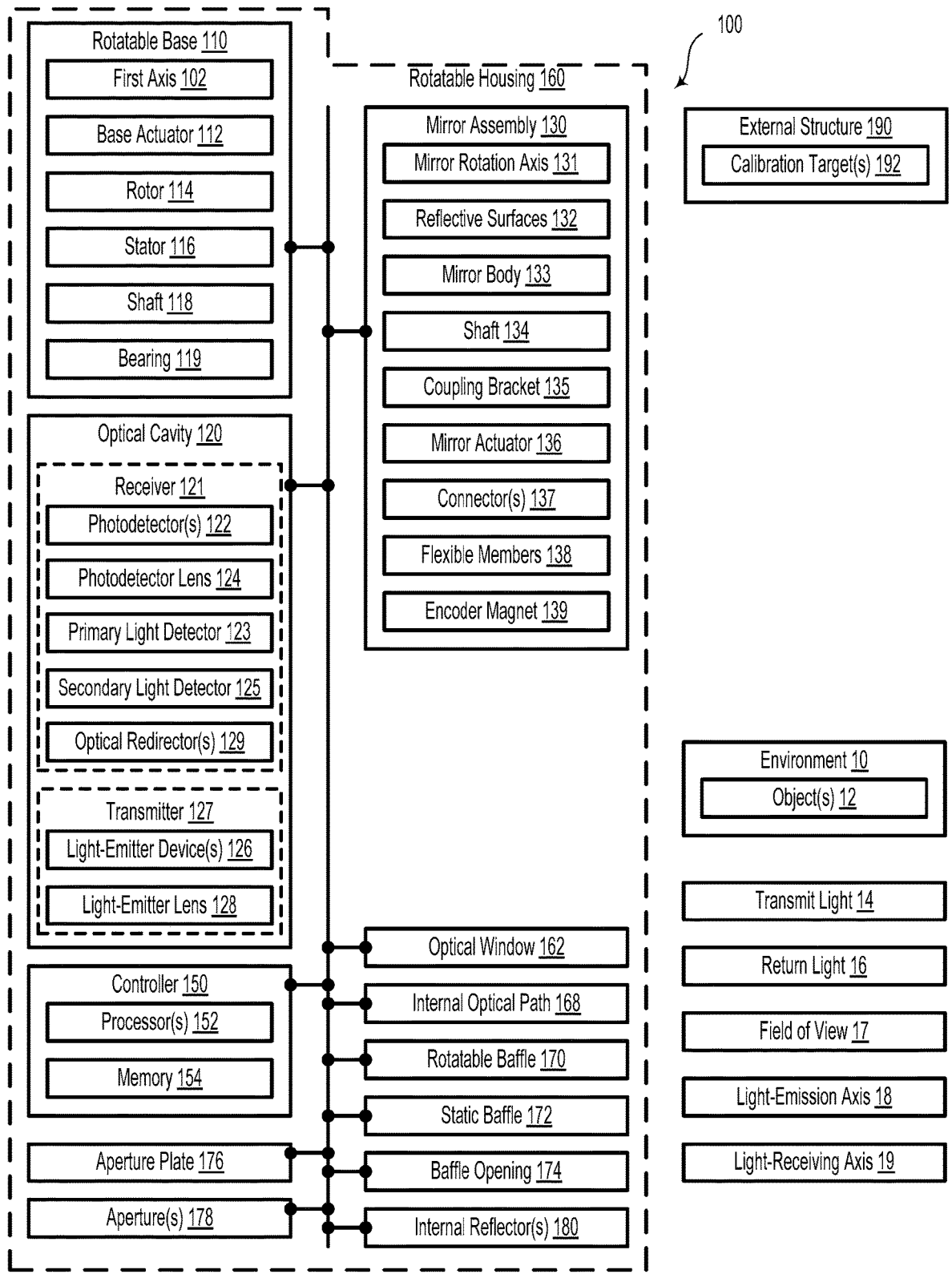
FIG. 1 is a simplified block diagram of a system, according to an example embodiment.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein. Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein. Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. Overview

One example lidar system herein includes a transmitter and a receiver. The transmitter may include one or more light-emitter devices (e.g., one or more laser bars with one to eight laser diodes each) configured to transmit light into an environment of the lidar system via one or more optical elements in a transmit path (e.g., a transmit lens, a rotatable mirror, and an optical window). The rotatable mirror could be configured to rotate about a mirror rotation axis. The rotatable mirror could be configured to interact with light pulses emitted by the one or more light-emitter devices so as to direct the light pulses in different directions toward a field-of-view (FOV) of the LIDAR system. Furthermore, the rotatable mirror may be configured to direct light pulses toward the receiver after such light pulses have interacted with the environment to form return light pulses.

Within examples, systems and methods for occlusion detection are provided. For instance, an example occlusion detection system could provide a way to determine the presence of dust, dirt, and/or cracks on the optical window and/or other types of occlusions that at least partially occludes the LIDAR system from scanning the FOV via the optical window.

Continuing with the example above, the LIDAR system may include a reflective mounting bracket disposed at least partially outside an optical cavity that includes the transmitter and the receiver. In some implementations, the reflective mounting bracket could physically couple the LIDAR system to a mounting surface. The mounting surface could include, for example, a body of a vehicle.

In one implementation, the reflective mounting bracket could include a reflective surface configured to reflect at least a portion of the emitted light (transmitted from the transmitter through the optical window) back to the LIDAR system (and through the optical window) for receipt by the receiver. For instance, the reflective surface may correspond to a portion of the reflective mounting bracket that is within the FOV scanned by the LIDAR system. In some embodiments, the mounting bracket (or the scanned portion thereof) is within a given distance (e.g., 50 millimeters, etc.) to the optical window.

In another implementation, an external surface of any other external structure physically coupled to the LIDAR device may reflect the at least portion of the emitted light instead of or in addition to being reflected at the mounting bracket. In one example, the mounting bracket may be configured to mount the LIDAR device onto the body of a vehicle. In this example, the external surface may correspond to any external surface of the vehicle (e.g., body panel, side-view mirror structure, bumper, fender, etc.) that is within the FOV of the LIDAR device. Thus, in this example, the external surface may remain at a fixed position relative to the LIDAR device even if the vehicle moves in the environment. In another example, the LIDAR device may be mounted to a building. In this example, the external structure/surface may instead include a wall, door, window frame, or any other external feature of the building within the FOV of the LIDAR device. Other examples are possible.

In some examples, the scan(s) of the reflective mounting bracket (or other external structure) could be used to detect the presence of an occlusion on or near the optical window. For example, if light reflected from the reflective mounting bracket (or the external structure) and received by the LIDAR device has a lower than expected intensity, then an example system may determine that an occlusion (e.g., dirt, dust, mud, water, etc.) is reducing an amount of energy transmitted to and/or received from the reflective surface of the mounting bracket (or the external structure). Thus, by scanning across the reflective surface of the mounting bracket, an example system may be configured to determine whether an occlusion is present on the optical window or elsewhere along an optical path between the LIDAR device and the mounting bracket (or the external structure).

Additionally or alternatively, in some examples, the scan(s) could be used to detect an optical defect in the LIDAR device. For example, if light reflected from the external structure (e.g., mounting bracket) and received by the LIDAR device has a lower than expected intensity, then an example system may determine that an optical defect associated with the reduction in the light intensity (e.g., laser dimming) is present. For instance, the optical defect may relate to a change in the relative positions of one or more optical components in the LIDAR device (e.g., an optical misalignment), aging of one or more light emitter(s) (e.g., laser diodes) in the LIDAR device, and/or any other type of optical defect that could cause dimming (e.g., light intensity reduction) of the light transmitted and/or received by the LIDAR device.

II. Example Systems

FIG. 1 illustrates a system 100, according to an example embodiment. In some embodiments, the system 100 could be a laser-based distance and ranging (lidar) system, or a portion thereof. In such scenarios, the system 100 could be configured to emit light pulses into an environment 10 so as to provide information indicative of objects 12 within a field of view (FOV) 17. As shown, system 100 may include or may be physically coupled to an external structure 190. For instance, system 100 may be mounted at a given position relative to external structure 190 such that system 100 and external structure 190 remain in a predetermined physical arrangement relative to one another.

In some examples, system 100 could be coupled to a vehicle (or other system) so as to provide information about an external environment of the vehicle. In one example, external structure 190 may include a mounting structure (e.g., a mounting bracket) that physically couples system 100 to the vehicle. Thus, in this example, system 100 may remain at a given position relative to the mounting structure (e.g., even as the vehicle moves in the environment). In other examples, external structure 190 may include any structure (e.g., side-view mirror structure of the vehicle, body panel of the vehicle, bumper of the vehicle, etc.) physically coupled to system 100 such that an external surface of the external structure remains at a fixed position relative to a given position of system 100 (e.g., even as the vehicle moves in the environment).

As shown, external structure 190 could optionally include one or more calibration targets 192. Calibration target(s) 192, for example, may include one or more surfaces having particular textures, varying reflectivity and/or emissivity surfaces, patterned targets, among other possibilities. By way of example, a particular calibration target may be configured to re-direct or absorb all but a given portion of incident beam energy away from the receiver 121 (e.g., a black dot-shaped surface disposed on a tilted mirror, etc.).

Various other example calibration target configurations are possible as well. In some examples, calibration target(s) 192 may be disposed on at least a portion of external structure 190 that is within FOV 17. As such, system 100 may be configured to scan the at least portion of the external structure 190 (where calibration target 192 is located) while scanning FOV 17.

As shown, system 100 includes a rotatable base 110 configured to rotate about a first axis 102. In some embodiments, a base actuator 112 could be operable to rotate the rotatable base 110 about the first axis 102 at an azimuthal rotational rate between 3 Hertz and 60 Hertz (e.g., between 180 revolutions per minute (RPM) and 3600 RPM). However, other azimuthal rotational rates are possible and contemplated. In some embodiments, the base actuator 112 could be controlled by the controller 150 to rotate at a desired rotational rate. In such scenarios, the controller 150 could control the base actuator 112 to rotate at a single target rotational rate and/or the controller 150 could dynamically adjust a desired rotational rate of the base actuator 112 within a range of possible rotational rates.

In some embodiments, the base actuator 112 could include an electric motor. For example, the electric motor could include a stator 116 and a rotor 114 that could be operable to rotate a shaft 118 of the rotatable base 110. In various embodiments, the base actuator 112 could be a direct current (DC) motor, a brushless motor, or another type of rotational actuator. In some embodiments, the shaft 118 could be coupled to the rotatable base 110 by way of one or more bearings 119. Bearings 119 could include a rotational bearing or another type of low-friction bearing.

In some embodiments, system 100 need not include a rotatable base 110. In such scenarios, one or more elements of the system 100 within housing 160 may be configured to rotate about the first axis 102. However, in other cases, some elements of the system 100 need not rotate about the first axis 102. Accordingly, in such embodiments, system 100 could be utilized in line-scanning applications, single-point scan applications, among other possibilities.

The system 100 also includes a mirror assembly 130 with shaft 134 and a mirror body 133 that is configured to rotate about a mirror rotation axis 131. In some embodiments, the mirror rotation axis 131 could be substantially perpendicular to the first axis 102 (e.g., within 0 to 10 degrees of perpendicular). In an example embodiment, a mirror actuator 136 could be configured to rotate the mirror body 133 about the mirror rotation axis 131 at a mirror rotational rate between 100 Hz to 1000 Hz (e.g., between 6,000 RPM and 60,000 RPM). In some contexts, the mirror body 133 could be configured to rotate about the mirror rotation axis 131 within a period of rotation (e.g., between 3.3 milliseconds and 1 millisecond).

The mirror actuator 136 could be a DC motor, a brushless DC motor, an AC motor, a stepper motor, a servo motor, or another type of rotational actuator. It will be understood that the mirror actuator 136 could be operated at various rotational speeds or at a desired rotational speed, and that the mirror actuator 136 could be controlled by the controller 150.

In example embodiments, the mirror assembly 130 includes a plurality of reflective surfaces 132. For example, the plurality of reflective surfaces 132 could include four reflective surfaces. In various embodiments, the reflective surfaces 132 could be formed from at least one of: gold, silicon oxide, titanium oxide, titanium, platinum, or aluminum. In such scenarios, the four reflective surfaces could be arranged symmetrically about the mirror rotation axis 131 such that a mirror body 133 of the mirror assembly 130 has a rectangular prism shape. It will be understood that the mirror assembly 130 could include more or less than four reflective surfaces. Accordingly, the mirror assembly 130 could be shaped as a multi-sided prism shape having more or less than four sides. For example, the mirror assembly 130 could have three reflective surfaces. In such scenarios, the mirror body 133 could have a triangular cross-section.

In some embodiments, the mirror body 133 could be configured to couple the plurality of reflective surfaces 132 to the shaft 134. In such scenarios, the mirror body 133 could be substantially hollow. In various embodiments, at least a portion of the mirror body 133 could have an octagonal cross-section and/or a four-fold symmetry. In one example, mirror body 133 may include a polycarbonate material. In this example, an octagonal and/or four-fold symmetry configuration for mirror body 133 may facilitate reducing potential slippage of the polycarbonate material of the mirror body 133 on the shaft 134 during rotation of the mirror body. Other examples are possible as well.

In some embodiments, the mirror body 133 could include a plurality of flexible support members 138. In such scenarios, at least one flexible support member 138 could be straight. Additionally or alternatively, at least one flexible support member 138 could be curved. In some embodiments, based on a geometry of the system of flexible support members, the mirror body 133 could be stiff in some directions (e.g., to transfer load) and elastic in some directions to accommodate thermal expansion. For example, the flexible support members 138 could be configured to be substantially stiff when in torsion and substantially elastic in response to forces perpendicular to the rotational axis. In various embodiments, the mirror body 133 could be formed from an injection molded material. Furthermore, the shaft 134 could be formed from steel or another structural material.

In some embodiments, the mirror assembly 130 could include an encoder magnet 139, which could be coupled to the shaft 134. In such scenarios, the encoder magnet 139 is configured to provide information indicative of a rotational position of the rotatable mirror assembly 130 with respect to the transmitter 127 and the receiver 121.

In some embodiments, encoder magnet 139 may also be configured as a mirror motor magnet (e.g., included in mirror actuator 136). In these embodiments, system 100 may use magnet 139 to facilitate both measuring and adjusting the rotational position of the rotatable mirror assembly 130. In one example embodiment, magnet 139 may be one of a plurality of magnets (e.g., magnet ring, etc.) disposed in a circular arrangement and configured to interact with a magnetic field (e.g., generated at actuator 136) to cause the rotation of the mirror assembly. Other embodiments are possible.

In various examples, the mirror assembly 130 could additionally or alternatively include a coupling bracket 135 configured to couple at least a portion of the mirror assembly 130 to the other elements of system 100, such as housing 160. The coupling bracket 135 could be configured to attach the mirror assembly 130 to the housing 160 by way of one or more connectors 137. In such scenarios, the coupling bracket 135 and the connectors 137 could be configured to be easily removable from other elements of the system 100. Such ease of removability could provide better recalibration, service, and/or repair options.

The system 100 additionally includes an optical cavity 120 coupled to the rotatable base 110. The optical cavity includes a transmitter 127 having at least one light-emitter device 126 and a light-emitter lens 128. In example embodiments, the at least one light-emitter device 126 could include one or more laser diode. Other types of light sources are possible and contemplated. The at least one light-emitter device 126 and the light-emitter lens 128 are arranged so as to define a light-emission axis 18.

In various embodiments, the rotatable mirror assembly 130 could be configured to controllably rotate about the mirror rotation axis 131 so as to transmit emission light toward, and receive return light from, locations within the environment 10.

The optical cavity 120 also includes a receiver 121 configured to detect return light 16 from the environment 10. The receiver 121 includes a plurality of photodetectors 122. As an example, the plurality of photodetectors 122 could include at least one solid-state single-photon-sensitive device. For example, in some embodiments, the plurality of photodetectors 122 could include one or more silicon photomultipliers (SiPMs). In such scenarios, the SiPMs could each include a plurality (e.g., a two-dimensional array) of single-photon avalanche diodes (SPADs). Additionally or alternatively, the plurality of photodetectors 122 could include an avalanche photodiode (APD), an infrared photodiode, photoconductor, or another type of photodetector. Additionally, it will be understood that systems incorporating multiple photodetectors, such as a focal plane array or another type of image sensor, are also possible and contemplated.

The plurality of photodetectors 122 includes a respective set of two or more photodetectors for each light-emitter device of the at least one light-emitter device 126. In various embodiments, the at least one light-emitter device 126 could be configured to emit light pulses that interact with the mirror assembly 130 such that the light pulses are redirected toward an environment 10 of the system 100 as transmit light 14. In such scenarios, at least a portion of the light pulses could be reflected back toward the system 100 as return light 16 and received by the plurality of photodetectors 122 so as to determine at least one of: a time of flight, a range to an object 12, and/or a point cloud.

In example embodiments, the photodetectors 122 could provide an output signal to the controller 150. For example, the output signal could include information indicative of a time of flight of a given light pulse toward a given portion of the field of view 17 of the environment 10. Additionally or alternatively, the output signal could include information indicative of at least a portion of a range map or point cloud of the environment 10.

In some embodiments, each set of two or more photodetectors could include a primary light detector 123 and a secondary light detector 125. The primary light detector 123 is configured to receive a first portion of return light 16 corresponding to light pulses emitted from a given light-emitter device. In such scenarios, the secondary light detector 125 is configured to receive a second portion of return light emitted from the given light-emitter device.

In various embodiments, the first portion of the return light 16 and the second portion of the return light 16 could have widely different intensities. For example, the first portion of the return light 16 could be at least an order of magnitude greater in photon flux than the second portion of the return light 16.

In an example embodiment, the at least one light-emitter device 126 could include a four-element laser diode bar (e.g., four discrete light sources disposed on a laser bar). In such scenarios, the plurality of photodetectors 122 could include four primary light detectors. Each primary light detector could correspond to a respective light-emitter on the laser diode bar. Additionally, the plurality of photodetectors 122 could include four secondary light detectors. Each secondary light detector could correspond to a respective light-emitter on the laser diode bar.

In alternate embodiments, the at least one light-emitter device 126 may include two or more laser diode bars, and a laser bar may include more or fewer than four light-emitter devices.

In some embodiments, the light-emitter device 126 could be coupled to a laser pulser circuit operable to cause the light-emitter device 126 to emit one or more laser light pulses. In such scenarios, the laser pulser circuit could be coupled to a trigger source, which could include controller 150. The light-emitter device 126 could be configured to emit infrared light (e.g., light having a wavelength between 800-1600 nanometers (nm), such as 905 nm). However, other wavelengths of light are possible and contemplated.

The receiver 121 also includes a photodetector lens 124. The plurality of photodetectors 122 and the photodetector lens 124 are arranged so as to define a light-receiving axis 19. At least one of the light-receiving axis 19 or the light-emission axis 18 form a tilt angle with respect to the first axis 102. As an example, the tilt angle could be between 5-30 degrees. However, other tilt angles are possible and contemplated.

The receiver 121 additionally includes a plurality of apertures 178, which may be openings in an aperture plate 176. In various embodiments, the aperture plate 176 could have a thickness between 50 microns and 200 microns. Additionally or alternatively, at least one aperture of the plurality of apertures 178 may have a diameter between 150 microns and 300 microns. However, other aperture sizes, larger and smaller than this range, are possible and contemplated. Furthermore, in an example embodiment, the respective apertures of the plurality of apertures 178 could be spaced apart by between 200 microns and 800 microns. Other aperture spacings are possible and contemplated.

The receiver 121 could also include one or more optical redirectors 129. In such a scenario, each optical redirector 129 could be configured to optically couple a respective portion of return light 16 from a respective aperture to at least one photodetector of the plurality of photodetectors 122. For example, each optical redirector could be configured to optically couple a respective portion of return light from a respective aperture to at least one photodetector of the plurality of photodetectors by total internal reflection.

In some embodiments, the optical redirectors 129 could be formed from an injection-moldable optical material. In such scenarios, the optical redirectors 129 are coupled together in element pairs such that a first element pair and a second element pair are shaped to slidably couple with one another. In example embodiments, the optical redirectors 129 are configured to separate the return light 16 into unequal portions so as to illuminate a first photodetector with a first photon flux of a first portion of the return light 16 and illuminate a second photodetector with a second photon flux of a second portion of the return light 16.

In some examples, optical redirectors 129 may also be configured to expand a beam width of the first portion of the return light 16 projected onto the first photodetector (and/or the second portion of the return light 16 projected onto the second photodetector). In this way, for example, detection area(s) at the respective photodetectors on which respective portion(s) of the return light 16 are projected may be greater than cross-sectional areas of their associated apertures.

In various example embodiments, the rotatable base 110, the mirror assembly 130, and the optical cavity 120 could be disposed so as to provide a field of view 17. In some embodiments, the field of view 17 could include an azimuthal angle range of 360 degrees about the first axis 102 and an elevation angle range of between 60 degrees and 120 degrees (e.g., at least 100 degrees) about the mirror rotation axis 131. In one embodiment, the elevation angle range could be configured to allow system 100 to direct one or more emitted beams along the direction of (and/or substantially parallel to) the first axis 102. It will be understood the other azimuthal angle ranges and elevation angle ranges are possible and contemplated.

In some embodiments, the field of view 17 could have two or more continuous angle ranges (e.g., a "split" field of view or a discontinuous field of view). In one embodiment, the two or more continuous angle ranges may extend away from a same side of the first axis 102. Alternatively, in another embodiment, the two or more continuous angle ranges may extend away from opposite sides of the first axis 102. For example, a first side of the first axis 102 may be associated with elevational angle between 0 degrees and 180 degrees, and a second side of the first axis may be associated with elevational angles between 180 degrees and 360 degrees.

In some embodiments, the system 100 includes a rotatable housing 160 having an optical window 162. The optical window 162 could include a flat window. Additionally or alternatively, the optical window 162 could include a curved window and/or a window with refractive optical power. As an example, the curved window could provide an extended field of view (compared to a flat optical window) in exchange for some loss or degradation in the quality of the optical beam. In such scenarios, the light pulses could be emitted toward, transmitted through, and received from, the environment 10 through the optical window 162. Furthermore, although one optical window is described in various embodiments herein, it will be understood that examples with more than one optical window are possible and contemplated.

The optical window 162 could be substantially transparent to light having wavelengths such as those of the emitted light pulses (e.g., infrared wavelengths). For example, the optical window 162 could include optically transparent materials configured to transmit the emitted light pulses with a transmission efficiency greater than 80% in the infrared wavelength range. In one embodiment, the transmission efficiency of the optical window 162 may be greater than or equal to 98%. In another embodiment, the transmission efficiency of the optical window 162 may vary depending on the angles-of-incidence of the transmit and/or receive light incident on the optical window 162. For instance, the transmission efficiency may be lower when light is incident on the optical window from relatively higher angles-of-incidence than when the light is incident from relatively lower angles-of-incidence.

In some examples, the optical window 162 could be formed from a polymeric material (e.g., polycarbonate, acrylic, etc.), glass, quartz, or sapphire. It will be understood that other optical materials that are substantially transparent to infrared light are possible and contemplated.

In some embodiments, other portions of the rotatable housing 160 could be coated with, or be formed from, an optically absorptive material such as black tape, absorptive paint, carbon black, black anodization and/or micro-arc oxidation treated surface or material, and/or another type of optically absorptive, anti-reflective surface or material.

The various elements of system 100 could be disposed in different arrangements. For example, in an example embodiment, at least one of the light-receiving axis 19 or the light-emission axis 18 does not intersect the mirror rotation axis 131.

The system 100 includes a controller 150. In some embodiments, the controller 150 includes at least one of a field-programmable gate array (FPGA) or an application-specific integrated circuit (ASIC). Additionally or alternatively, the controller 150 may include one or more processors 152 and a memory 154. The one or more processors 152 may include a general-purpose processor or a special-purpose processor (e.g., digital signal processors, graphics processor units, etc.). The one or more processors 152 may be configured to execute computer-readable program instructions that are stored in the memory 154. As such, the one or more processors 152 may execute the program instructions to provide at least some of the functionality and operations described herein.

The memory 154 may include, or take the form of, one or more computer-readable storage media that may be read or accessed by the one or more processors 152. The one or more computer-readable storage media can include volatile and/or non-volatile storage components, such as optical, magnetic, organic, or other memory or disc storage, which may be integrated in whole or in part with at least one of the one or more processors 152. In some embodiments, the memory 154 may be implemented using a single physical device (e.g., one optical, magnetic, organic or other memory or disc storage unit), while in other embodiments, the memory 154 can be implemented using two or more physical devices. Thus, in one embodiment, memory 154 may include a non-transitory computer readable medium storing instructions that, when executed by the one or more processors 152, cause system 100 to perform at least some of the operations described herein.

As noted, the memory 154 may include computer-readable program instructions that relate to operations of system 100. As such, the memory 154 may include program instructions to perform or facilitate some or all of the operations or functionalities described herein.

For example, the operations could include causing the light-emitter device 126 to emit the light pulses. In such scenarios, the controller 150 could cause a pulser circuit associated with light-emitter device 126 to provide one or more current/voltage pulses to the light-emitter device 126, which may cause the light-emitter device 126 to provide the light pulses.

The operations could also include receiving at least a first portion of reflected light pulses (e.g., return light 16) from the field of view 17 as a detected light signal. For example, at least some of the light pulses emitted from the light-emitter device 126 via the optical window 162 (e.g., transmit light 14) could interact with objects 12 in the environment 10 in the field of view 17 so as to provide reflected light pulses or return light 16. At least the portion of the reflected light pulses could be received by at least one photodetector of the plurality of photodetectors 122. In turn, the given photodetector could provide a detected light signal, which could include a photocurrent signal or a photovoltage signal.

Furthermore, the operations could include determining, based on the detected light signal, a point cloud indicative of objects 12 within the field of view 17. In an example embodiment, determining the point cloud could be performed by controller 150. For example, the controller 150 could determine and accumulate a plurality of spatial points based on a respective time of flight for each light pulse emitted and received. Determining the point cloud could be further based on an elevation angle of the mirror assembly 130 and an azimuthal angle of the rotatable base 110.

It will be understood that some or all of the operations described herein could be carried out by computing devices located remotely from the controller 150 and/or other elements of system 100.

In various embodiments, the system 100 could include at least one baffle. For example, the system 100 could include at least one rotatable baffle 170 and/or at least one static baffle 172. In such scenarios, the at least one rotatable baffle 170 and/or at least one static baffle 172 could be configured to reduce stray light within the optical cavity 120 (e.g., light traveling internally from the light-emitter device 126 to the plurality of photodetectors 122 without first interacting with the environment around the system 100). In an example embodiment, the static baffle 172 could include an optically-opaque material disposed between the light-receiving axis 19 and the light-emission axis 18. In some embodiments, the rotatable baffle 170 could be coupled to the mirror body 133 and could also include an optically-opaque material configured to reduce or eliminate stray light between the transmitter portions and the receiver portions of the system 100. In other words, a first portion of the mirror body 133 and a second portion of the mirror body 133 could be separated by the rotatable baffle 170. In such scenarios, the rotatable baffle 170 could be shaped like a flat disk, however other shapes are contemplated and possible. The rotatable baffle 170 could be centered about, and perpendicular to, the mirror rotation axis 131.

In some embodiments, the system 100 could include an optical feedback system. As a part of the optical feedback system, the transmitter 127 could be configured to transmit, during the period of rotation of the mirror body 133, a plurality of light pulses toward the reflective surfaces 132 of the mirror assembly 130. In such a scenario, the mirror assembly 130 could be configured to (i) reflect at least a first light pulse of the plurality light pulses into an environment 10 of the system 100 and (ii) reflect at least a second light pulse of the plurality of light pulses into an internal optical path 168. In some embodiments, the internal optical path 168 may include a baffle opening 174 in the rotatable baffle 170, the static baffle 172, and/or in a gap between the rotatable baffle 170 and the static baffle 172.

In such scenarios, the plurality of photodetectors 122 of the receiver 121 could be configured to (i) detect a reflected light pulse including a reflection of the first light pulse caused by an object 12 in the environment 10 and (ii) detect the second light pulse received via the internal optical path 168. In various embodiments, the internal optical path 168 could be defined at least in part by one or more internal reflectors 180 that reflect the second light pulse toward the reflective surfaces 132 of the mirror assembly 130 such that the reflective surfaces 132 reflect the second light pulse toward the receiver 121.

Furthermore, in such scenarios, the controller 150 could be configured to determine a distance to the object 12 in the environment 10 based on a time when the first light pulse is transmitted by the transmitter 127, a time when the reflected light pulse is detected by the photodetector 122, and a time when the second light pulse is detected by the photodetector 122. In such scenarios, a first light pulse (and its corresponding reflected light pulse) could provide information indicative of a distance to an object and a second light pulse (and its corresponding reflected light pulse) could provide information indicative of a feedback distance or zero-length reference.

Figure 2:
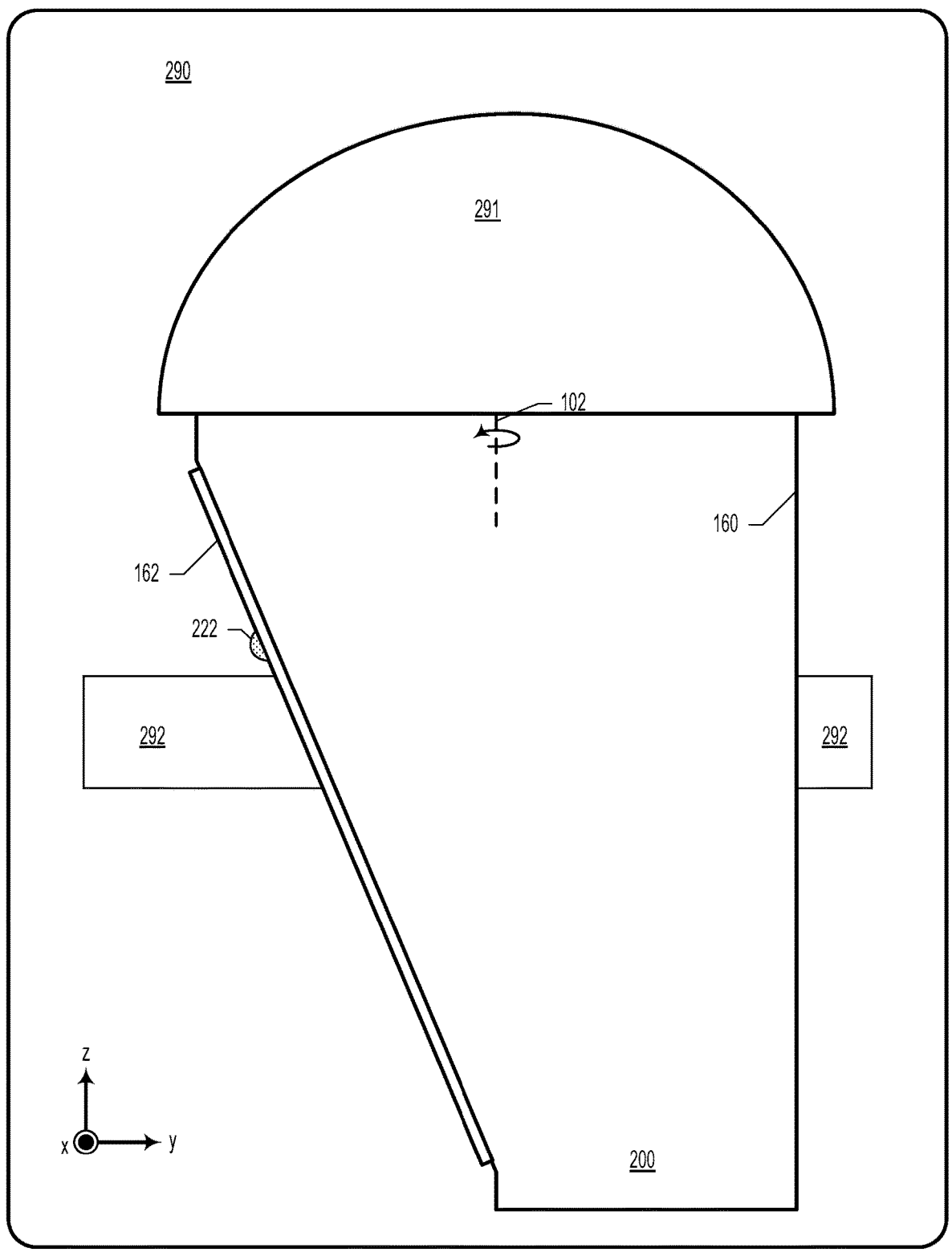
FIG. 2 illustrates a LIDAR device mounted to a mounting structure, according to example embodiments.
Figure 3A:
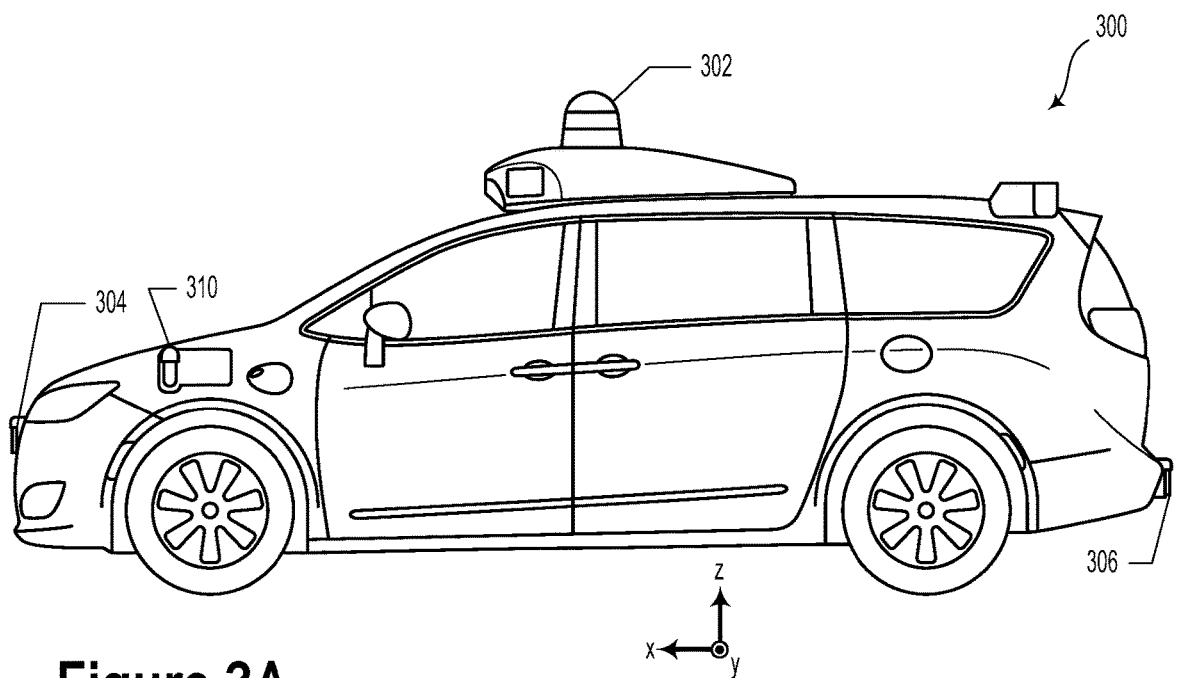
FIG. 3A illustrates a first view of a vehicle, according to an example embodiment.
Figure 3B:
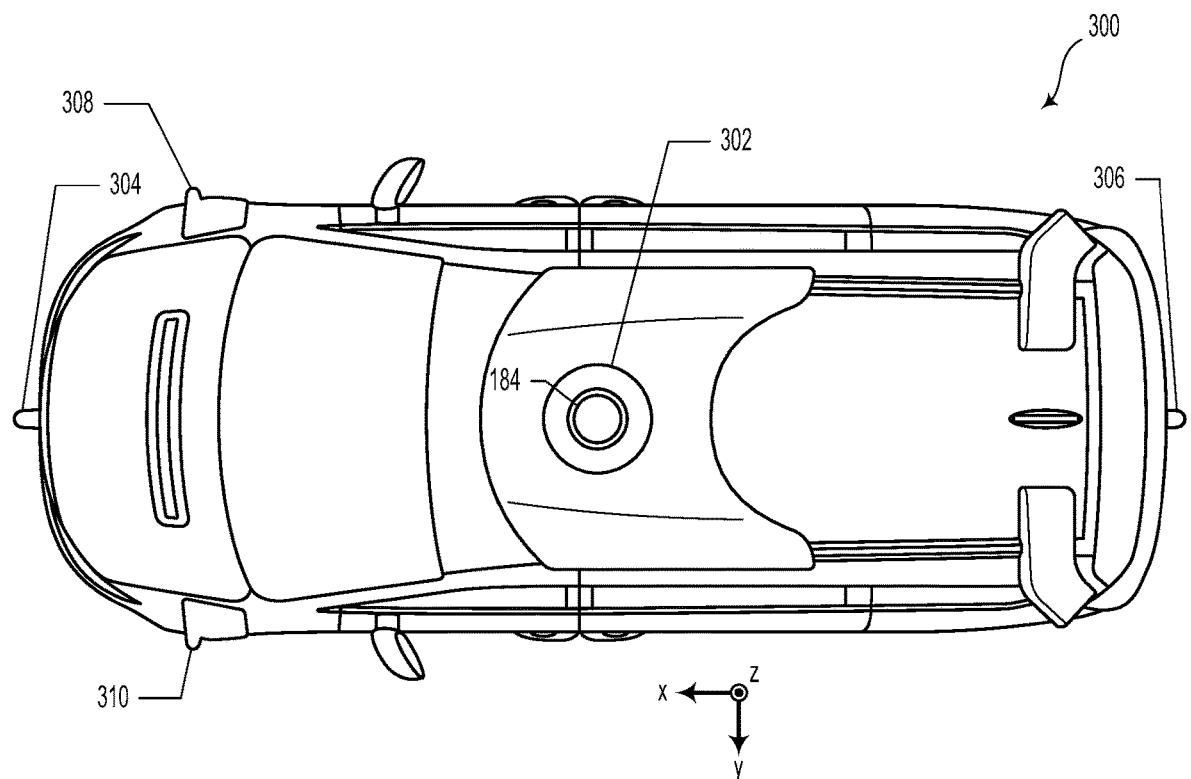
FIG. 3B illustrates a second view of the vehicle, according to an example embodiment.
Figure 3C:
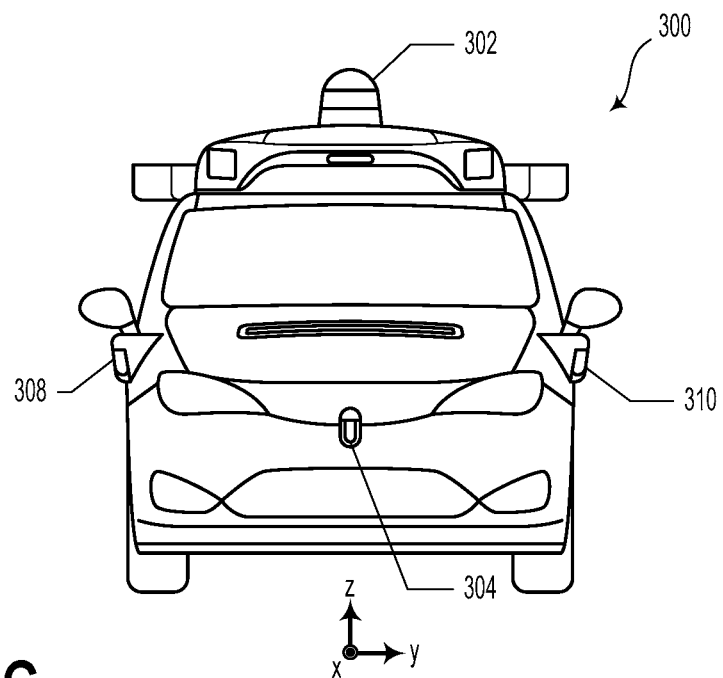
FIG. 3C illustrates a third view of the vehicle, according to an example embodiment.
Figure 3D:
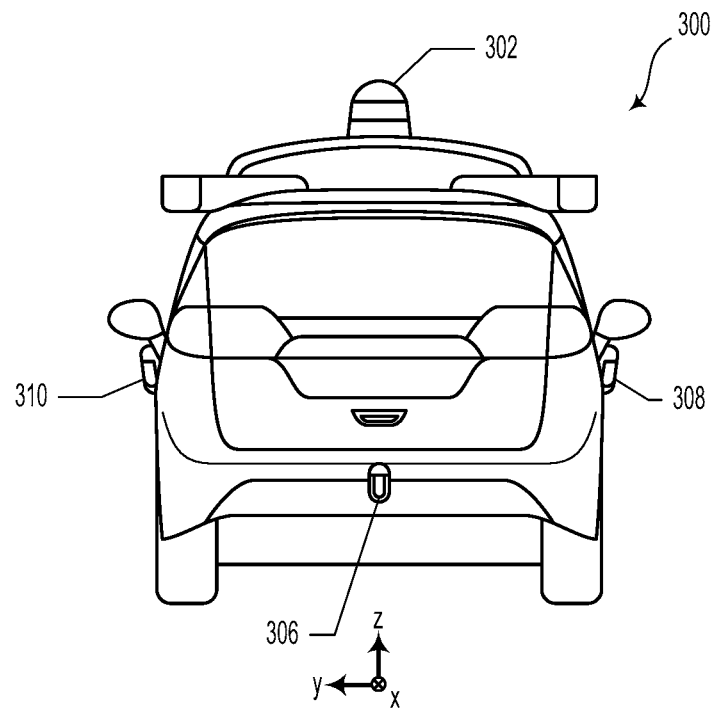
FIG. 3D illustrates a fourth view of the vehicle, according to an example embodiment.
Figure 3E:
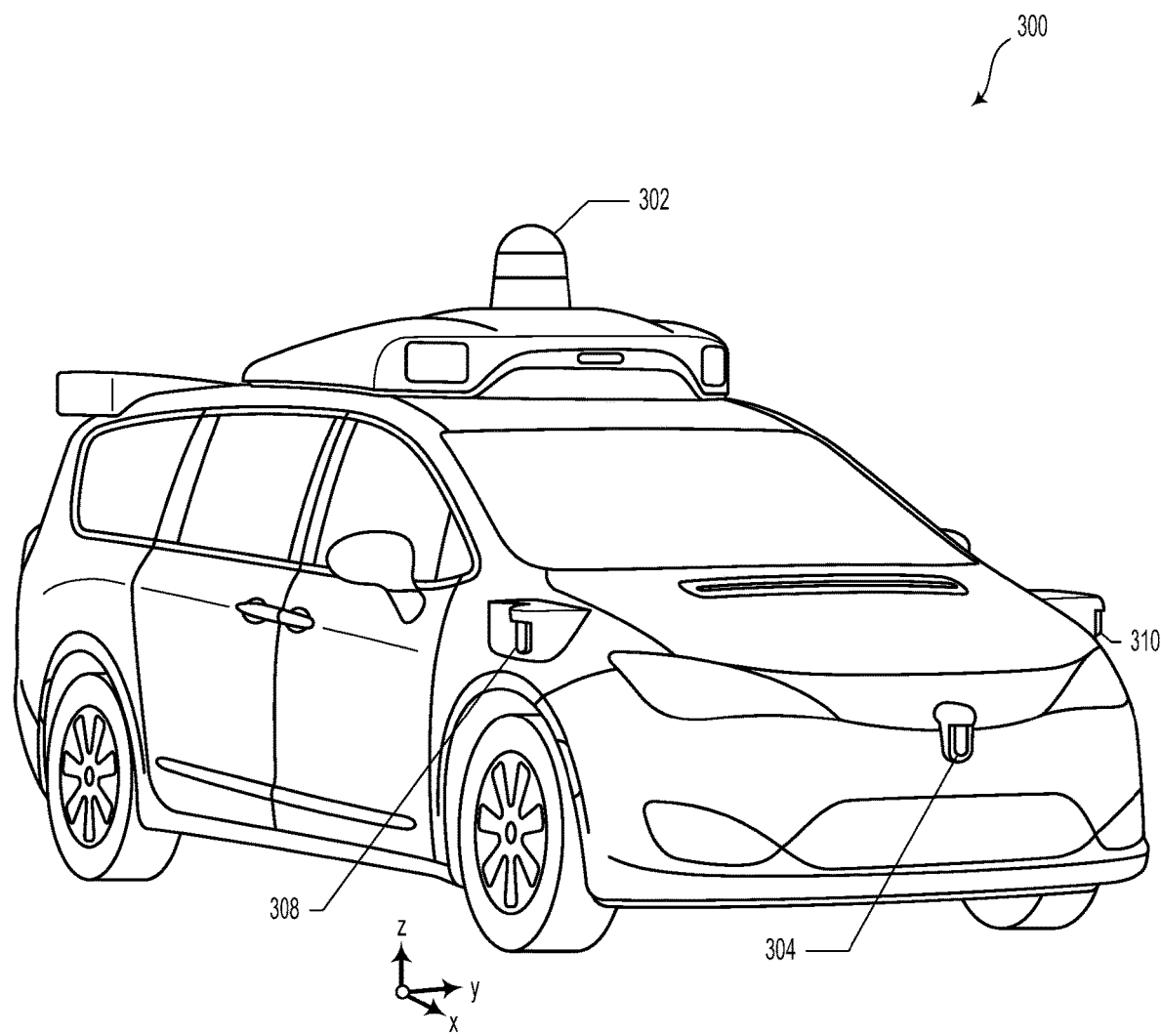
FIG. 3E illustrates a fifth view of the vehicle, according to an example embodiment.

FIG. 2 illustrates a LIDAR device 200 mounted to a mounting structure 290, according to example embodiments. For convenience in illustration, an x-y-z axis is shown in FIG. 2.

Mounting structure 290 may be similar to external structure 190. For example, mounting structure 290 may be formed from any solid material suitable for physically supporting LIDAR 200 while housing 160 and/or one or more components therein rotates about axis 102.

As shown in FIG. 2, LIDAR 200 may be physically coupled to mounting structure 290 via receiving structure 291. In one example, receiving structure 291 may include a curved wall of mounting structure 290 that extends out of the page to define a recess in which a portion of LIDAR 200 can be inserted to physically couple LIDAR 200 with mounting structure 290. For instance, a first portion of LIDAR 200 may be physically connected to mounting structure 290 at receiving structure 291, and a bottom portion of LIDAR 200 that includes optical window 162 may remain outside receiving structure 291. Other examples are possible as well to physically mount LIDAR 200 at a given position relative to mounting structure 290.

As shown in FIG. 2, a calibration target 292 is disposed on a surface of mounting structure 290. Calibration target 292 may be similar to calibration target 191 described in connection with system 100, for instance. For the sake of example, calibration target 292 is shown to extend horizontally (e.g., along the y-axis) along the surface of mounting structure 290 such that at least a portion of calibration target 292 (not shown) overlaps LIDAR 200 (e.g., the portion behind LIDAR 200). In other examples however, target 292 may alternatively be positioned at a different location along any surface of mounting structure 290 that is within the FOV scanned by LIDAR 200 as the LIDAR (or a portion thereof) rotates about axis 102. Additionally, target 292 may alternatively have a different size and/or shape than shown in FIG. 2. Thus, it should be understood that various shapes, sizes, and locations of calibration target 292 are possible and that target 292 is illustrated as shown in FIG. 2 only for convenience in description.

In some embodiments, LIDAR 200 could include an occlusion detection system. The occlusion detection system could be configured to provide information indicative of a presence of an occlusion object 222 associated with (e.g., coupled to or near) optical window 162.

It will be understood that while FIG. 2 illustrates occlusion object 222 as being disposed on an external surface of the optical window 162, other occlusion objects could be located elsewhere. In one example, occlusion object 222 may alternatively include an external object coupled near optical window 162. For instance, a plastic bag or other object (not shown) may be coupled to the mounting structure or the LIDAR or other external structure and may extend such that at least a portion of such external object is present at or near the LIDAR. In another example, occlusion object 222 may alternatively include an occlusion integrated in optical window 162, itself, such as a crack or a cloudy or opaque region of optical window 162. Other examples are possible.

In the example illustrated in FIG. 2, LIDAR 200 may scan at least a portion of mounting structure 290 (e.g., the portion where calibration target(s) 292 is located, etc.) disposed within the FOV scanned by LIDAR 200. For instance, as LIDAR 200 (or a portion thereof) rotates about axis 102, one or more of the light pulses emitted through optical window 162 (e.g., when optical window 162 is facing the mounting structure, etc.) may propagate toward mounting structure 290. LIDAR 200 (or another computing system that receives data from LIDAR 200) may then detect the presence of occlusion 222, for instance, by comparing reflectivity characteristics of the scanned portion of mounting structure 290 with predetermined and/or otherwise expected reflectivity characteristics.

In some examples, mounting structure 290 could reflect a "first light pulse" and a "second light pulse". In some embodiments, the corresponding reflected light pulses returning back to the LIDAR 200 from the mounting structure 290 could be used as a basis for determining a reference time (e.g., "zero-time") instead of or in addition to, for example, a given reference time determined based on a scan of an external calibration target and/or other known feature in the environment. In some scenarios, using the mounting structure for determining the reference time may improve accuracy of the determined reference time due to the predetermined physical arrangement of the LIDAR 200 relative to the mounting structure 290 (e.g., as compared to the given reference time computed using an external calibration target that is not necessarily physically coupled to the LIDAR 200).

III. Example Vehicles

FIGS. 3A, 3B, 3C, 3D, and 3E illustrate a vehicle 300, according to an example embodiment. The vehicle 300 could be a semi- or fully-autonomous vehicle. While FIGS. 3A-3E illustrate vehicle 300 as being an automobile (e.g., a passenger van), it will be understood that vehicle 300 could include another type of autonomous vehicle, robot, or drone that can navigate within its environment using sensors and other information about its environment.

The vehicle 300 may include one or more sensor systems 302, 304, 306, 308, and 310. In some embodiments, sensor systems 302, 304, 306, 308, and 310 could include LIDAR sensors having a plurality of light-emitter devices arranged over a range of angles with respect to a given plane (e.g., the x-y plane).

One or more of the sensor systems 302, 304, 306, 308, and 310 may be configured to rotate about an axis (e.g., the z-axis) perpendicular to the given plane so as to illuminate an environment around the vehicle 300 with light pulses. Based on detecting various aspects of reflected light pulses (e.g., the elapsed time of flight, polarization, intensity, etc.), information about the environment may be determined.

In an example embodiment, sensor systems 302, 304, 306, 308, and 310 may be configured to provide respective point cloud information that may relate to physical objects within the environment of the vehicle 300. While vehicle 300 and sensor systems 302, 304, 306, 308, and 310 are illustrated as including certain features, it will be understood that other types of sensor systems are contemplated within the scope of the present disclosure.

An example embodiment may include a system having a plurality of light-emitter devices. The system may include a transmit block of a lidar device. For example, the system may correspond to (or may be included in) a lidar device of a vehicle (e.g., a car, a truck, a motorcycle, a golf cart, an aerial vehicle, a boat, etc.). Each light-emitter device of the plurality of light-emitter devices is configured to emit light pulses along a respective beam elevation angle. The respective beam elevation angles could be based on a reference angle or reference plane. In some embodiments, the reference plane may be based on an axis of motion of the vehicle 300.

While lidar systems with single light-emitter devices are described and illustrated herein, lidar systems with multiple light-emitter devices (e.g., a light-emitter device with multiple laser bars on a single laser die) are also contemplated. For example, light pulses emitted by one or more laser diodes may be controllably directed about an environment of the system. The angle of emission of the light pulses may be adjusted by a scanning device such as, for instance, a mechanical scanning mirror and/or a rotational motor. For example, the scanning devices could rotate in a reciprocating motion about a given axis and/or rotate about a vertical axis. In another embodiment, the light-emitter device may emit light pulses towards a spinning prism mirror, which may cause the light pulses to be emitted into the environment based on an angle of the prism mirror angle when interacting with each light pulse. Additionally or alternatively, scanning optics and/or other types of electro-opto-mechanical devices are possible to scan the light pulses about the environment. Embodiments utilizing a plurality of fixed beams are also contemplated within the context of the present disclosure.

In some embodiments, a single light-emitter device may emit light pulses according to a variable shot schedule and/or with variable power per shot, as described herein. That is, emission power and/or timing of each laser pulse or shot may be based on a respective elevation angle of the shot. Furthermore, the variable shot schedule could be based on providing a desired vertical spacing at a given distance from the lidar system or from a surface (e.g., a front bumper) of a given vehicle supporting the lidar system. As an example, when the light pulses from the light-emitter device are directed downwards, the power-per-shot could be decreased due to a shorter anticipated maximum distance to target. Conversely, light pulses emitted by the light-emitter device at an elevation angle above a reference plane may have a relatively higher power-per-shot so as to provide sufficient signal-to-noise to adequately detect pulses that travel longer distances.

In some embodiments, the power/energy-per-shot could be controlled for each shot in a dynamic fashion. In other embodiments, the power/energy-per-shot could be controlled for successive set of several pulses (e.g., 10 light pulses). That is, the characteristics of the light pulse train could be changed on a per-pulse basis and/or a per-several-pulse basis.

While FIGS. 3A-3E illustrates various lidar sensors attached to the vehicle 300, it will be understood that the vehicle 300 could incorporate other types of sensors, such as a plurality of optical systems (e.g., cameras), radars, or ultrasonic sensors.

In an example embodiment, vehicle 300 could include a lidar system (e.g., system 100) configured to emit light pulses into an environment of the vehicle 300 so as to provide information indicative of objects within a default field of view. For example, vehicle 300 could include an optical system (e.g., system 100) having a rotatable base (e.g., rotatable base 110) configured to rotate about a first axis (e.g., first axis 102). The optical system could also include a mirror assembly (e.g., mirror assembly 130). The mirror assembly could be configured to rotate about a mirror rotation axis. In some embodiments, the mirror rotation axis is substantially perpendicular to the first axis.

The optical system also includes an optical cavity (e.g., optical cavity 120) coupled to the rotatable base. In such scenarios, the optical cavity includes at least one light-emitter device (e.g., light-emitter device 126) and a light-emitter lens (e.g., light-emitter lens 128). The at least one light-emitter device and the light-emitter lens are arranged so as to define a light-emission axis (e.g., light-emission axis 18).

The optical system additionally includes a plurality of photodetectors (e.g., photodetectors 122. In an example embodiment, the plurality of photodetectors includes a respective set of two or more photodetectors for each light-emitter device of the at least one light-emitter device. The optical system also includes a photodetector lens (e.g., photodetector lens 124. In such scenarios, the plurality of photodetectors and the photodetector lens are arranged so as to define a light-receiving axis (e.g., light-receiving axis 19). In some embodiments, at least one of the light-receiving axis or the light-emission axis could form a tilt angle with respect to the first axis.

In some embodiments, each set of two or more photodetectors could include a primary light detector (e.g., primary light detector 123) and a secondary light detector (e.g., secondary light detector 125). In such scenarios, the primary light detector is configured to receive a first portion of return light emitted from a given light-emitter device. Furthermore, the secondary light detector is configured to receive a second portion of return light emitted from the given light-emitter device.

In some embodiments, the first portion of the return light is at least an order of magnitude greater in photon flux than the second portion of the return light.

IV. Example Methods

Figure 4:
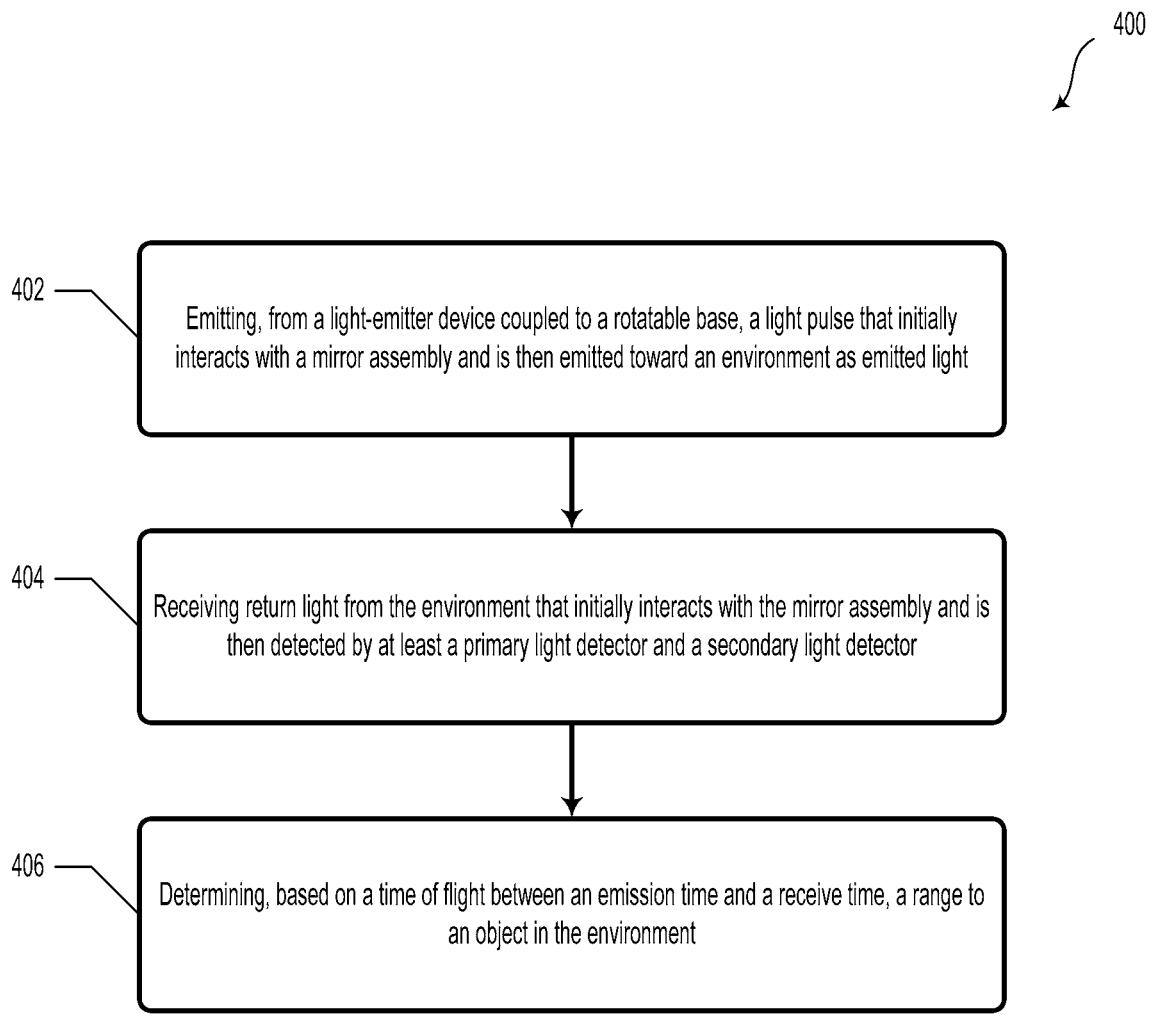
FIG. 4 illustrates a method, according to an example embodiment.

FIG. 4 illustrates a method 400, according to an example embodiment. It will be understood that the method 400 may include fewer or more steps or blocks than those expressly illustrated or otherwise disclosed herein. Furthermore, respective steps or blocks of method 400 may be performed in any order and each step or block may be performed one or more times. In some embodiments, some or all of the blocks or steps of method 400 may be carried out by controller 150 and/or other elements of system 100, LIDAR 200, and/or vehicle 300 as illustrated and described in relation to FIGS. 1, 2, and/or 3A-3E, respectively.

Block 402 includes emitting, from a light-emitter device coupled to a rotatable base, a light pulse that initially interacts with a mirror assembly and is then emitted toward an environment as emitted light Block 404 includes receiving return light from the environment that initially interacts with the mirror assembly and is then detected by at least a primary light detector and a secondary light detector.

Block 406 includes determining, based on a time of flight between an emission time and a receive time, a range to an object in the environment.

In some embodiments, method 400 may additionally include causing the rotatable base to rotate about a first axis, causing the mirror assembly to rotate about a mirror rotation axis, and, while the mirror assembly is rotating, repeating the emitting, receiving, and determining steps so as to form a point cloud. The point cloud includes a plurality of ranges or range data within a three-dimensional representation of the environment.

Figure 5:
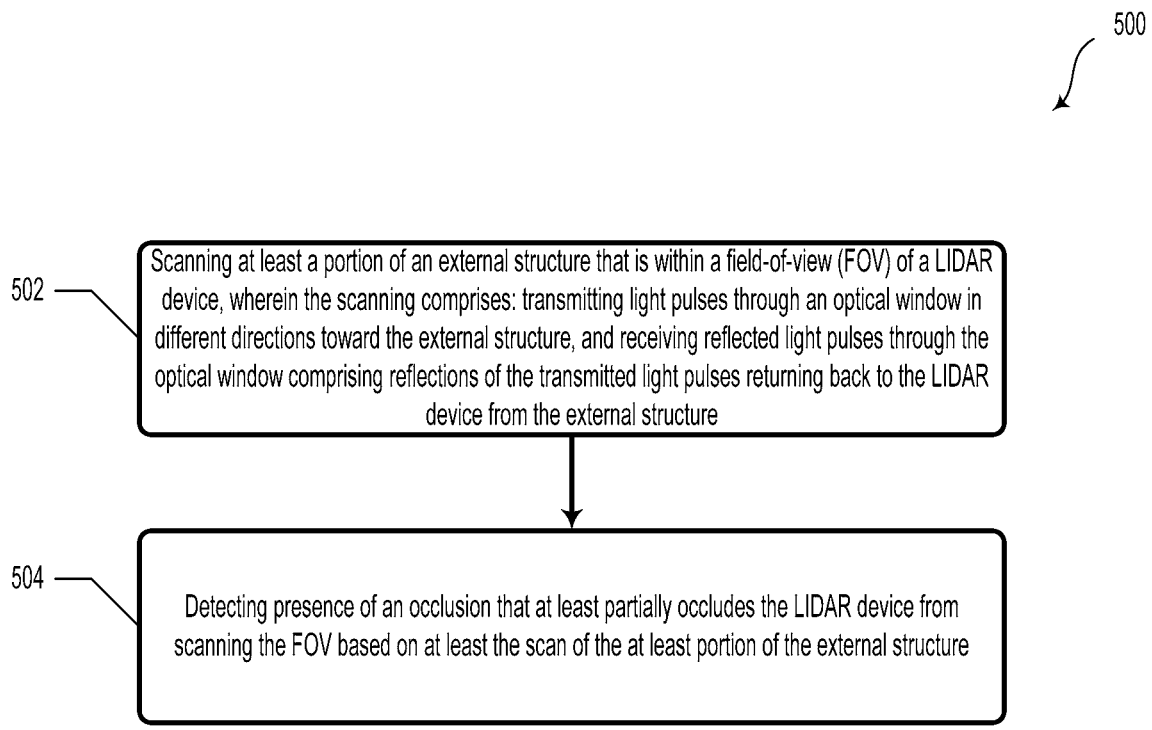
FIG. 5 illustrates another method, according to an example embodiment.

FIG. 5 illustrates a method 500, according to an example embodiment. It will be understood that the method 500 may include fewer or more steps or blocks than those expressly illustrated or otherwise disclosed herein. Furthermore, respective steps or blocks of method 500 may be performed in any order and each step or block may be performed one or more times. In some embodiments, some or all of the blocks or steps of method 500 may be carried out by controller 150 and/or other elements of system 100, LIDAR 200, and/or vehicle 300 as illustrated and described in relation to FIGS. 1, 2, and 3A-3E, respectively.

At block 502, method 500 involves scanning at least a portion of an external structure that is within a field-of-view of a LIDAR device.

In a first example, the external structure may correspond to a mounting structure, and the LIDAR device may be mounted to the mounting structure. Referring back to FIG. 2 for instance, LIDAR 200 may be mounted to mounting structure 290, which in turn could optionally mount LIDAR 200 to another system (not shown), such as vehicle 300. Thus, in this example, the LIDAR device may be physically coupled to the external structure (e.g., mounting structure 290) such that the LIDAR device remains at an offset position relative to the external structure. For instance, as shown in FIG. 2, LIDAR 200 and mounting structure 290 may be physically connected in a particular relative arrangement while the LIDAR 200 (or a portion thereof) rotates about axis 102.

In a second example, the external structure may correspond to any other structure that is physically coupled (directly or indirectly) to the LIDAR device such that the external structure remains at a predetermined offset position relative to the LIDAR 200. Referring back to FIG. 3A for instance, the external structure may correspond to a component of vehicle 300 (or portion thereof) that is within a FOV scanned by LIDAR 310 (e.g., body panel of the vehicle, bumper of the vehicle, fender of the vehicle, rear view mirror of the vehicle, etc.). Thus, in this example, the LIDAR device may be physically coupled (e.g., indirectly) to the external structure (e.g., any component of the vehicle that has an external surface within the FOV of the LIDAR device) such that the LIDAR device remains at an offset position relative to the external structure. Referring back to FIG. 3A for instance, the external structure may be a body panel of the vehicle and the LIDAR device may be LIDAR 310 that is mounted to the vehicle at a particular mounting position. In this instance, the body panel and the LIDAR 310 may remain in a particular relative arrangement defined by the particular mounting position of LIDAR 310 relative to a given position of the body panel at the vehicle. Further, in this instance, if vehicle 300 moves in the environment, the body panel (i.e., the external structure) and the LIDAR 310 (i.e., LIDAR device) may remain in that same particular relative arrangement.

For convenience in description, it is noted that the terms "mounting structure" and "external structure" may be used interchangeably in the description of the various blocks of method 500. However, it should be understood that some examples herein where the external structure is a mounting structure can alternatively be implemented using any other external structure physically coupled (directly or indirectly) to the LIDAR device (and vice versa), without departing from the scope of the present disclosure.

The scanning at block 502 may involve transmitting light pulses (e.g., light 14) through an optical window (e.g., optical window 162) in different directions toward the at least portion of the external structure. For example, a series of emitted light pulses may be directed by LIDAR 200 into different directions, and one or more of the emitted light pulses may thus be transmitted (through optical window 162) toward the at least portion of the external structure (e.g., mounting structure 290 shown in FIG. 2) that is within the FOV of LIDAR 200.

The scanning at block 502 may also involve receiving reflected light pulses (e.g., light 16) through the optical window comprising reflections of the transmitted light pulses returning back to the LIDAR device from the external structure, in line with the discussion above.

At block 504, method 500 involves detecting presence of an occlusion that at least partially occludes the LIDAR device from scanning the FOV based on at least the scan of block 502.

Referring back to FIG. 2 for example, a system of method 500 may determine that occlusion 222 is present based on the scan indicating that one or more reflected light pulses returning from mounting structure 290 have a lower intensity than an expected intensity. As another example, the system may determine that the occlusion is present in response to the scan indicating that the appearance, position, and/or other characteristic of the external structure indicated by the scan is different than expected. Other examples are possible.

In some examples, method 500 involves comparing reflectivity characteristics of the external structure indicated by the scan with predetermined reflectivity characteristics. In these embodiments, detecting the presence of the occlusion at block 504 may be based on the comparison. For instance, the scanned portion of the external structure may be associated with predetermined characteristics that are measured prior to the scan and compared with the measurements indicated by the scan to determine whether an occlusion is present.

In one example, the predetermined reflectivity characteristics are based on a previous scan of the external structure by the LIDAR device. For example, LIDAR 200 may be configured to repeatedly scan its FOV, and thus LIDAR 200 or another system of method 500 may detect the occlusion if the reflectivity characteristics indicated by the scan at block 502 differ from the predetermined reflectivity characteristics indicated by the previous scan.

In another example, the predetermined reflectivity characteristics may be associated with one or more calibration targets disposed on the at least portion of the external structure. Referring back to FIG. 2 for example, predetermined characteristics (e.g., textures, patterns, etc.) of calibration target 292 can be compared with measured characteristics indicated by the scan at block 502 to determine whether the occlusion is present.

In some examples, method 500 involves determining whether the occlusion is disposed on the optical window based on one or more scans of the FOV by the LIDAR device. For example, one or more previous scans of the FOV may indicate a change in the characteristics and/or appearance of the external structure and/or other parts of the FOV in comparison with the corresponding characteristics and/or appearance indicated by the scan of block 502.

In some examples, method 500 involves rotating the LIDAR device about an axis (e.g., axis 102) during a rotation period, and the scan at block 502 may occur during a first portion of the rotation period. Referring back to FIG. 2 for example, the first portion of the rotation period may correspond to a time period when LIDAR 200 is within a range of angles about axis 102 at which light pulses emitted out of optical window 162 are directed toward mounting structure 290 (or any other external structure physically coupled to LIDAR 200 at a predetermined offset position therefrom). In some examples, method 500 involves scanning at least one object during a second portion of the rotation period.

In some examples, method 500 involves determining a reference time based on one or more time differences between transmit times of one or more of the light pulses transmitted toward the external structure and one or more receive times of one or more of the reflected light pulses returning back to the LIDAR device from the external structure. For example, the reference time (e.g., "zero-time") can be calibrated based on predetermined and/or known locations of one or more calibration targets (e.g., calibration targets 192, 292, etc.) and/or the external structure itself instead of or in addition to calibrating the reference time using a feature in the environment of the LIDAR device In these examples, method 500 may also involve determining a distance to the at least one object based on a transmit time of a light pulse transmitted toward the at least one object, a receive time of a reflected light pulse returning back to the LIDAR device from the at least one object, and the reference time. For example, in line with the discussion above, the measured time difference associated with the at least one object can be calibrated using the determined reference time.

In some examples, method 500 may involve detecting an optical misalignment (or other defect) in the LIDAR device. For instance, one or more components of LIDAR 200, such as any of mirror assembly 130, mirror surfaces 132, optical cavity 120, receiver 121, optical window 162, or any other component of the LIDAR, may become offset from its expected position and/or orientation. As an example of an optical misalignment, a misaligned rotatable base 110 may rotate about an offset axis different than axis 102. Other example optical misalignments are possible as well. In examples where such optical misalignments become present, the actual direction of a light pulse emitted out of LIDAR 200 may differ from an expected direction associated with a properly aligned LIDAR configuration. As such, in some examples, method 500 may involve detecting the optical misalignment (or other defect) in the LIDAR device based on measurements of angles (e.g., about axis 102) at which the external structure and/or one or more features thereon (e.g., calibration structure 292, etc.) are detected.

The arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. A method comprising:
   scanning, by a light detection and ranging (LIDAR) device mounted to a mounting structure, at least a portion of the mounting structure that is within a field-of-view (FOV) of the LIDAR device, wherein the mounting structure is coupled to a vehicle, wherein the scanning comprises:
   transmitting, through an optical window, light pulses in different directions toward the mounting structure, and
   receiving, through the optical window, reflected light pulses comprising reflections of the transmitted light pulses returning back to the LIDAR device from the mounting structure; and
   based on at least the scan of the at least portion of the mounting structure, detecting presence of an occlusion that at least partially occludes the LIDAR device from scanning the FOV.

2. The method of claim 1, further comprising:
   comparing reflectivity characteristics of the mounting structure indicated by the scan with predetermined reflectivity characteristics, wherein detecting the presence of the occlusion is based on the comparison.

3. The method of claim 2, wherein the predetermined reflectivity characteristics are based on a previous scan of the at least portion of the mounting structure by the LIDAR device.

4. The method of claim 2, wherein the at least portion of the mounting structure scanned by the LIDAR device includes one or more calibration targets disposed on the mounting structure, and wherein the predetermined reflectivity characteristics are associated with the one or more calibration targets.

5. The method of claim 1, further comprising:
   based on one or more scans of the FOV by the LIDAR device, determining whether the occlusion is disposed on the optical window.

6. The method of claim 1, further comprising:
   rotating the LIDAR device about an axis during a rotation period, wherein the scan of the at least portion of the mounting structure occurs during a first portion of the rotation period.

7. The method of claim 6, further comprising:
   scanning, by the LIDAR device, at least one object separate from the mounting structure during a second portion of the rotation period.

8. The method of claim 7, further comprising:
   determining a reference time based on one or more time differences between one or more transmit times of one or more of the light pulses transmitted toward the mounting structure and one or more receive times of one or more of the reflected light pulses returning back to the LIDAR device from the mounting structure; and
   determining a distance to the at least one object based on a transmit time of a light pulse transmitted toward the at least one object, a receive time of a reflected light pulse returning back to the LIDAR device from the at least one object, and the reference time.

9. A system comprising:
   a mounting structure, wherein the mounting structure is coupled to a vehicle;
   a light detection and ranging (LIDAR) device mounted to the mounting structure;
   an optical window;
   one or more processors; and
   data storage storing instructions that, when executed by the one or more processors, cause the system to perform operations comprising:
   scanning at least a portion of the mounting structure that is within a field-of-view (FOV) of the LIDAR device, wherein the scanning comprises:
   transmitting, through the optical window, light pulses from the LIDAR device in different directions toward the mounting structure, and
   receiving, through the optical window, reflected light pulses comprising reflections of the transmitted light pulses returning back to the LIDAR device from the mounting structure; and
   based on at least the scan of the at least portion of the mounting structure, detecting presence of an occlusion that at least partially occludes the LIDAR device from scanning the FOV.

10. The system of claim 9, wherein the operations further comprise:
    comparing reflectivity characteristics of the mounting structure indicated by the scan with predetermined reflectivity characteristics, wherein detecting the presence of the occlusion is based on the comparison.

11. The system of claim 10, wherein the predetermined reflectivity characteristics are based on a previous scan of the at least portion of the mounting structure.

12. The system of claim 10, further comprising:
    one or more calibration targets disposed on the scanned at least portion of the mounting structure, wherein the predetermined reflectivity characteristics are associated with the one or more calibration targets.

13. A non-transitory computer readable medium storing instructions that, when executed by one or more processors, cause a system to perform operations comprising:
    scanning, using a light detection and ranging (LIDAR) device mounted to a mounting structure, at least a portion of the mounting structure that is within a field-of-view (FOV) of the LIDAR device, wherein the mounting structure is coupled to a vehicle, wherein the scanning comprises:
    transmitting, through an optical window of the LIDAR device, light pulses in different directions toward the mounting structure, and
    receiving, through the optical window, reflected light pulses comprising reflections of the transmitted light pulses returning back to the LIDAR device from the mounting structure; and
    based on at least the scan of the at least portion of the mounting structure, detecting presence of an occlusion that at least partially occludes the LIDAR device from scanning the FOV.

14. The non-transitory computer readable medium of claim 13, wherein the operations further comprise:

comparing reflectivity characteristics of the mounting structure indicated by the scan with predetermined reflectivity characteristics, wherein detecting the presence of the occlusion is based on the comparison.

15. The non-transitory computer readable medium of claim 13, wherein the operations further comprise:
based on one or more scans of the FOV, determining whether the occlusion is disposed on the optical window.

16. The non-transitory computer readable medium of claim 13, wherein the operations further comprise:
rotating the LIDAR device about an axis during a rotation period, wherein the scan of the at least portion of the mounting structure occurs during a first portion of the rotation period.

17. The non-transitory computer readable medium of claim 16, wherein the operations further comprise:
scanning, using the LIDAR device, at least one object separate from the mounting structure during a second portion of the rotation period.

18. The non-transitory computer readable medium of claim 17, wherein the operations further comprise:
determining a reference time based on one or more time differences between one or more transmit times of one or more of the light pulses transmitted toward the mounting structure and one or more receive times of one or more of the reflected light pulses returning back to the LIDAR device from the mounting structure; and
determining a distance to the at least one object based on a transmit time of a light pulse transmitted toward the at least one object, a receive time of a reflected light pulse returning back to the LIDAR device from the at least one object, and the reference time.

19. The method of claim 4, wherein the one or more calibration targets have different reflectivities in different areas.

20. The system of claim 12, wherein the one or more calibration targets have different reflectivities in different areas.

* * * * *